United States Patent [19]

Vander Mey et al.

[11] Patent Number: 5,359,625
[45] Date of Patent: Oct. 25, 1994

[54] SPREAD SPECTRUM COMMUNICATION SYSTEM PARTICULARLY-SUITED FOR RF NETWORK COMMUNICATION

[75] Inventors: James E. Vander Mey; Timothy J. Vander Mey, both of Ocala, Fla.

[73] Assignee: Intellon Corporation, Ocala, Fla.

[21] Appl. No.: 131,031

[22] Filed: Oct. 4, 1993

Related U.S. Application Data

[63] Continuation of Ser. No. 923,331, Jul. 31, 1992, abandoned, which is a continuation-in-part of Ser. No. 775,279, Oct. 11, 1991, abandoned, which is a continuation of Ser. No. 397,803, Aug. 23, 1989, Pat. No. 5,090,024, which is a continuation of Ser. No. 863,213, Apr. 3, 1992, Pat. No. 5,278,862.

[51] Int. Cl.$^5$ .................................. H04L 27/30
[52] U.S. Cl. ................................... 375/1; 380/34
[58] Field of Search .............. 375/1; 380/34; 370/18

[56] References Cited

U.S. PATENT DOCUMENTS

| | | | |
|---|---|---|---|
| 3,665,474 | 5/1972 | Thayer | 370/18 X |
| 4,300,235 | 11/1981 | Outram | 375/1 |
| 4,307,380 | 12/1981 | Gander | 340/310 R |
| 4,438,519 | 3/1984 | Bose | 375/1 |
| 4,468,792 | 8/1984 | Baker et al. | 375/1 X |
| 4,641,322 | 2/1987 | Hasegawa | 375/1 |
| 4,653,076 | 3/1987 | Jerrim et al. | 370/18 X |
| 4,763,103 | 8/1988 | Galula et al. | 340/310 R |
| 4,969,159 | 11/1990 | Belcher et al. | 375/1 |
| 5,132,986 | 7/1992 | Endo et al. | 375/1 |

OTHER PUBLICATIONS

Dixon, Robert C., *Spread Spectrum Systems,* John Wiley & Sons, Inc. (1984), pp. XI–XV.

*Primary Examiner*—Bernarr E. Gregory
*Attorney, Agent, or Firm*—Fish & Richardson

[57] ABSTRACT

Spread spectrum communication using direct sequences that approximate a swept frequency waveform in which successive square waves are formed by the chips making up the sequence, and in which the durations of the square waves extend over a plurality of chips, and in which the frequency of the square waves varies across at least a portion of the sequence. Information is encoded by varying the direction of the direct sequence, so that the sequence is transmitted as either a forward or a reverse frequency-swept sequence. The spectrum of the direct sequences is in a passband. The direct sequence biphase modulates a carrier (e.g., RF) to produce a spread-spectrum signal with two passbands centered about the frequency of the modulated carrier. Received signals are fed to a correlator having forward and reverse sequence outputs, the outputs of the correlator are independently tracked, and generally different sampling times are used for taking samples of the forward and reverse correlator outputs for purposes of making decoding decisions. The receiver uses a local oscillator for demodulation that is not synchronized with the local oscillator used for modulation in the transmitter. The overall phase of successive direct sequences is pseudorandomly varied to produce a more uniform spreading of energy across the frequency band. Dual level coding is used, in which a quality and value outputs from the lower level decoding are used to provide, in effect, a correlator for the higher level decoding. Both 0 and 90 degree matched filter sections are provided to make the correlator insensitive to phase shifts.

57 Claims, 11 Drawing Sheets

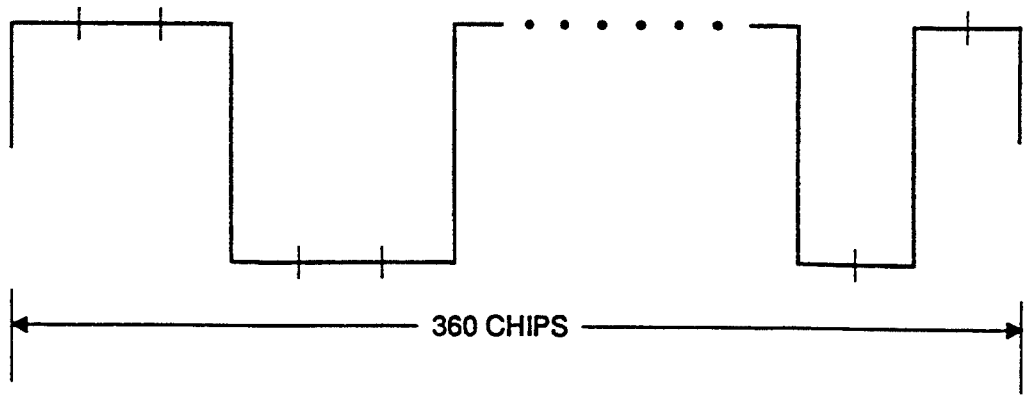
FIG 4A
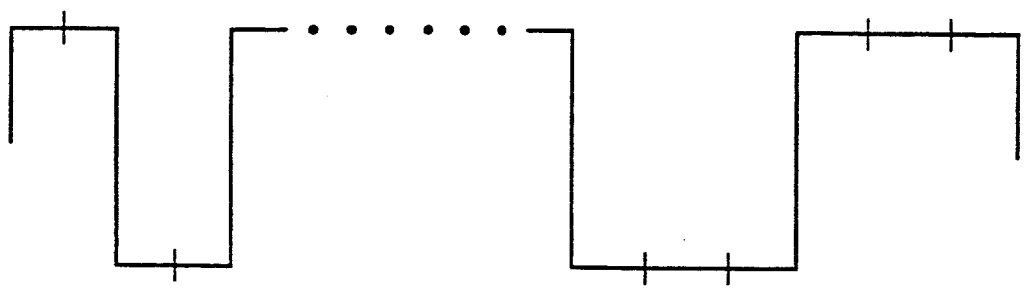
FIG 4B
```
111000111000111000110001110001110001110001100011100011100111
000111000110001110011100011000111001110001100011100111001110
001100011000110001100011000110001100011000110001100111001110
011000110001100111001100011001110011000110011100110011100110
011100110011100110011000110011001110011001100111001100110011
001110011001100110011001100111001100110011001100110011001100
```
FIG 5

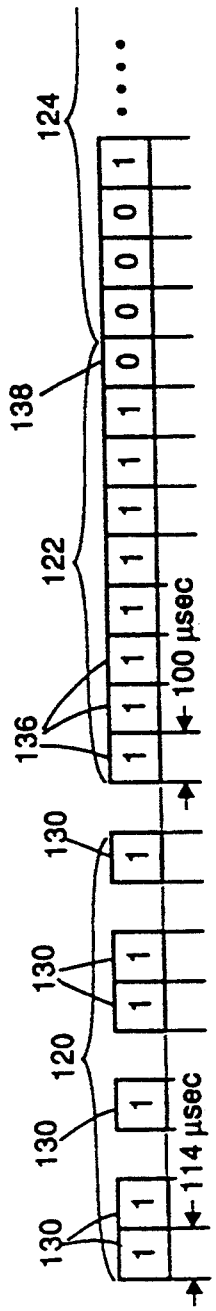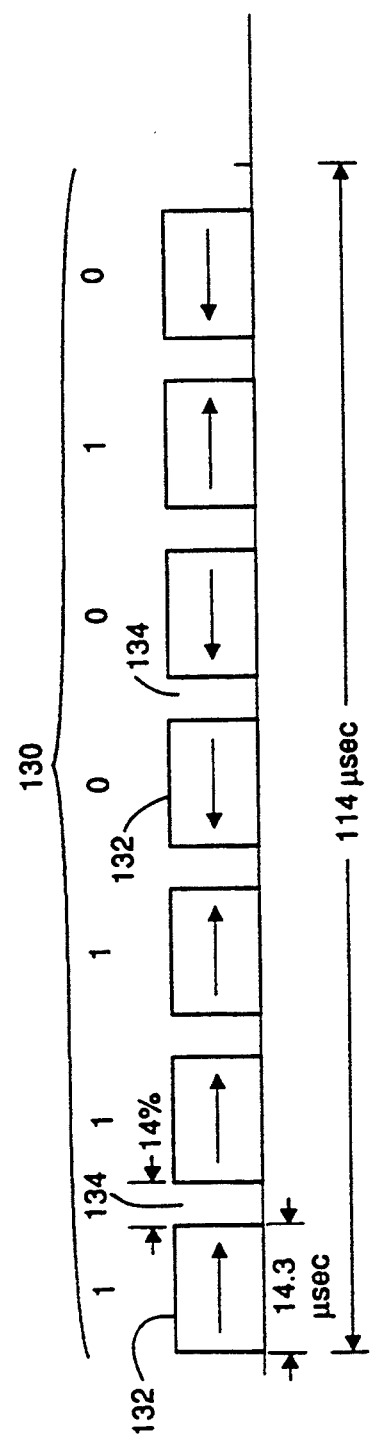
FIG 7
FIG 8

SPREAD SPECTRUM COMMUNICATION SYSTEM PARTICULARLY-SUITED FOR RF NETWORK COMMUNICATION

CROSS REFERENCE TO RELATED APPLICATIONS

This is a continuation of application Ser. No. 07/923,331, filed Jul. 31, 1992, now abandoned which is a continuation in part of U.S. Ser. No. 07/775,279, filed Oct. 11, 1991, now abandoned, (which is a continuation of U.S. Ser. No. 07/397,803, filed Aug. 23, 1989, now U.S. Pat. No. 5,090,024) and U.S. Ser. No. 07/863,213, filed Apr. 3, 1992, now U.S. Pat. No. 5.278,862. Both applications are incorporated by reference.

BACKGROUND OF THE INVENTION

This application relates to spread-spectrum communication systems and in particular to spread-spectrum communication systems for use on noisy network media, such as RF channels or AC power lines.

Spread-spectrum communication is a method whereby information is communicated using a bandwidth that greatly exceeds that required by information theory. These methods provide signals over a wide bandwidth, and with proper signal processing the communication is immune to large amounts of noise within that bandwidth. In chirp spread-spectrum methods, a signal burst known as a chirp is transmitted. Each chirp has energy spread across a frequency range. The frequency spread may be achieved by frequency sweeping or by such techniques as direct sequence coding. Chirps may be sent asynchronously, or at synchronous intervals, including as concatenated chirps. Data modulation of the chirp stream can be accomplished by means such as phase reversal modulation of the chirps or reversal of the frequency sequence of the chirp. A transversal filter in the receiver is matched to the chirp(s) expected, enabling individual chirps to be detected even on noisy network media such as power lines.

In a communication network, several transmitters and receivers may communicate with each other over a network medium. In certain networks, contention resolution and/or collision detection strategies are implemented to resolve situations in which two or more transmitters simultaneously require use of the network medium.

In U.S. Pat. No. 5,090,024, entitled Spread-Spectrum Communications System for Networks, and copending application, U.S. Ser. No. 07/863,213, entitled Timing for Spread-Spectrum Communication Across Noisy Media, systems are proposed for applying spread-spectrum communication to carrier-sense, multiple-access networks. Various embodiments are disclosed, including ones in which frequency-swept chirps are transmitted using ASK modulation for contention resolution and PRK modulation for data transmission.

Spread spectrum communication has been used for wireless, RF communication in local area networks. But these prior art RF systems have used pseudorandom direct sequence (typically maximal linear sequence) techniques, in which continuous synchronization of transmitter and receiver is required and maintained. These systems have generally required careful phase tracking mechanisms, and have been intolerant of any frequency offsets between transmitter and receiver carrier signals.

SUMMARY OF THE INVENTION

In a first aspect, the invention features spread spectrum communication using direct sequences that approximate a swept frequency waveform in which successive square waves are formed by the chips making up the sequence, and in which the durations of the square waves extend over a plurality of chips, and in which the frequency of the square waves varies approximately progressively across at least a portion of the sequence. In preferred embodiments, information is encoded by varying the direction of the frequency sweep in the direct sequences, so that the sequences have either a forward or a reverse frequency sweep; the spectrum of the direct sequences is in a passband spaced from baseband; the direct sequence is used to modulate a carrier (e.g., biphase modulation of an RF carrier) to produce a spread-spectrum signal also having a passband characteristic (preferably two passbands centered about the frequency of the modulated carrier). In other preferred embodiments, the direct sequences are transmitted directly without any modulation of a carrier.

In a second aspect, the invention features spread spectrum communication using direct sequences that have been chosen to produce a spread spectrum signal with a passband spectral characteristic. In preferred embodiments, this is achieved by the above-described technique of using as the direct sequence an approximate frequency swept signal.

In a third aspect, the invention features spread spectrum communication in which frequency-swept spread spectrum signals with different sweep directions convey information across the channel. In preferred embodiments, two spread spectrum signals one being the same as the other except for the direction of sweep are used; the frequency sweep is achieved using the above-described technique of using as the direct sequences forward and reverse swept approximations of a frequency swept signal. Alternatively, frequency swept chirps could be directly transmitted.

In a fourth aspect, the invention features spread spectrum communication in which the transmitted signals are forward and reverse swept signals, the received signals are fed to a correlator having forward and reverse sequence outputs, the outputs of the correlator are independently tracked, and generally different sampling times are used for taking samples of the forward and reverse correlator outputs for purposes of making decoding decisions. In preferred embodiments, the forward and reverse swept signals are generated using a direct sequence transmitted in forward or reverse directions; and the receiver uses a local oscillator for demodulation that is not synchronized in frequency or phase with the local oscillator used for modulation in the transmitter.

In a fifth aspect, the invention features direct sequence spread spectrum communication in which the overall phase of successive direct sequences is pseudorandomly varied to produce a more uniform spreading of energy across the frequency band of the transmitted signal, and further reduce potential phase cancellation by interfering continuous wave signals. In preferred embodiments, each successive direct sequence has its overall phase pseudorandomly varied with respect to prior direct sequences.

In a sixth aspect, the invention features spread spectrum communication with dual level coding. Information is transmitted as "superbits", which are encoded as unique sequences of "subbits", each represented by a unique spread spectrum signal. Correlator outputs in the receiver are used to generate both value and quality indicators at the subbit level, with the quality indicator providing a measure of the likelihood that the value indicator is correct. The value and quality indicators are combined in decoding the superbits. In preferred embodiments, superbits are decoded using, in effect a superbit correlator which compares the value bits to unique subbit sequences associated with superbits, and combines the results of that comparison with the quality bits to generate for each successive subbit a superbit correlator output. Superbit tracking is initiated when the superbit correlator is above threshold, and subsequent sampling for superbit decoding is done by sampling at intervals spaced by the length of a superbit.

In a seventh aspect, the invention features spread spectrum communication using a direct sequence and a reverse ordered version of the same direct sequence. In preferred embodiments, the direct sequence is either transmitted directly without modulation of a carrier (e.g., for transmission across power lines), or the sequence is used to modulate a carrier signal (e.g., in the RF frequency range); the direct sequence approximates a swept frequency waveform, in which successive square waves are formed by the chips, and in which the durations of the square waves extend over a plurality of the chips, and in which the frequency of the square waves varies approximately progressively across at least a portion of the sequence, from a low to a higher frequency in a forward swept sequence, and from a high to a lower frequency in a reverse swept sequence; the direct sequence has a spectrum with energy primarily in a passband (i.e., spaced from baseband).

In an eighth aspect, the invention features receiving and decoding a spread spectrum signal of the type in which forward and reverse order direct sequences are used to convey information. In preferred embodiments, the correlator uses a shared shift register and shared summing networks to model four matched filters—forward 0 and 90 degree filters, and reverse 0 and 90 degree filters. The correlator design takes advantage of the identity of the forward and reverse ordered direct sequences. Because of this identity, the matched filter for the forward ordered sequence is the mirror image of the matched filter for the reverse ordered sequence. To conserve on the size of the shift register and summing networks, approximately half of the taps in the shift register are assigned to represent the 0 degree filter sections and the remainder to represent the 90 degree filter sections. Each half of the taps is further divided into a common group for which values are common to both the forward and reverse ordered sequences and a difference group for which values are opposite for the forward and reverse ordered sequences, to produce a total of four groups of taps (0-degree common, 0-degree difference, 90-degree common, 90-degree difference). Four summing subnetwork are used to produce a sum of each of the four groups of taps. Each of the four filter section outputs is readily formed by combining two of the four subnetwork outputs. For example, the 0-degree forward output might be formed by adding the 0-degree difference sum to the 0-degree common sum, whereas the 0-degree reverse output might be formed by subtracting the 0-degree difference sum from the 0-degree common sum.

The invention has a variety of advantages. It provides a much improved communication technique for RF communications in a network environment. It allows a carrier-sense, multiple-access transceiver to be constructed with inexpensive frequency generating components. Decoding is insensitive to phase shifts and frequency shifts resulting from variations in the frequency of the receiver's local oscillator with respect to the transmitter's local oscillator. There is no need to synchronize the local oscillator used for demodulation to the local oscillator used for modulation. Improved spreading of energy across the spectral band is achieved by pseudorandom phase modulation of the direct sequences, with resulting decrease in transmitted peak signal power at any one frequency. The use of dual-level coding reduces the size of the matched filters while retaining much of the processing gain of a longer direct sequence. Multipath nulls, which can be a problem in RF communications within buildings and elsewhere, can be largely eliminated by transmitting two redundant sidebands, so that decoding can proceed even if a receiver is positioned at a null for one of the sidebands.

Other features and advantages of the invention will be apparent from the following description of preferred embodiments and from the claims.

BRIEF DESCRIPTION OF THE DRAWINGS

FIGS. 4A and 4B are plots of the forward and reverse chip sequences used by the transceiver.

FIG. 5 is a table showing the entire 360-chip forward sequence.

FIG. 7 is a diagrammatic illustration of the organization of a data packet.

FIG. 8 is a diagrammatic illustration of the modified superbit used in the preamble of the data packet.

DESCRIPTION OF THE PREFERRED EMBODIMENTS

Figure 1:
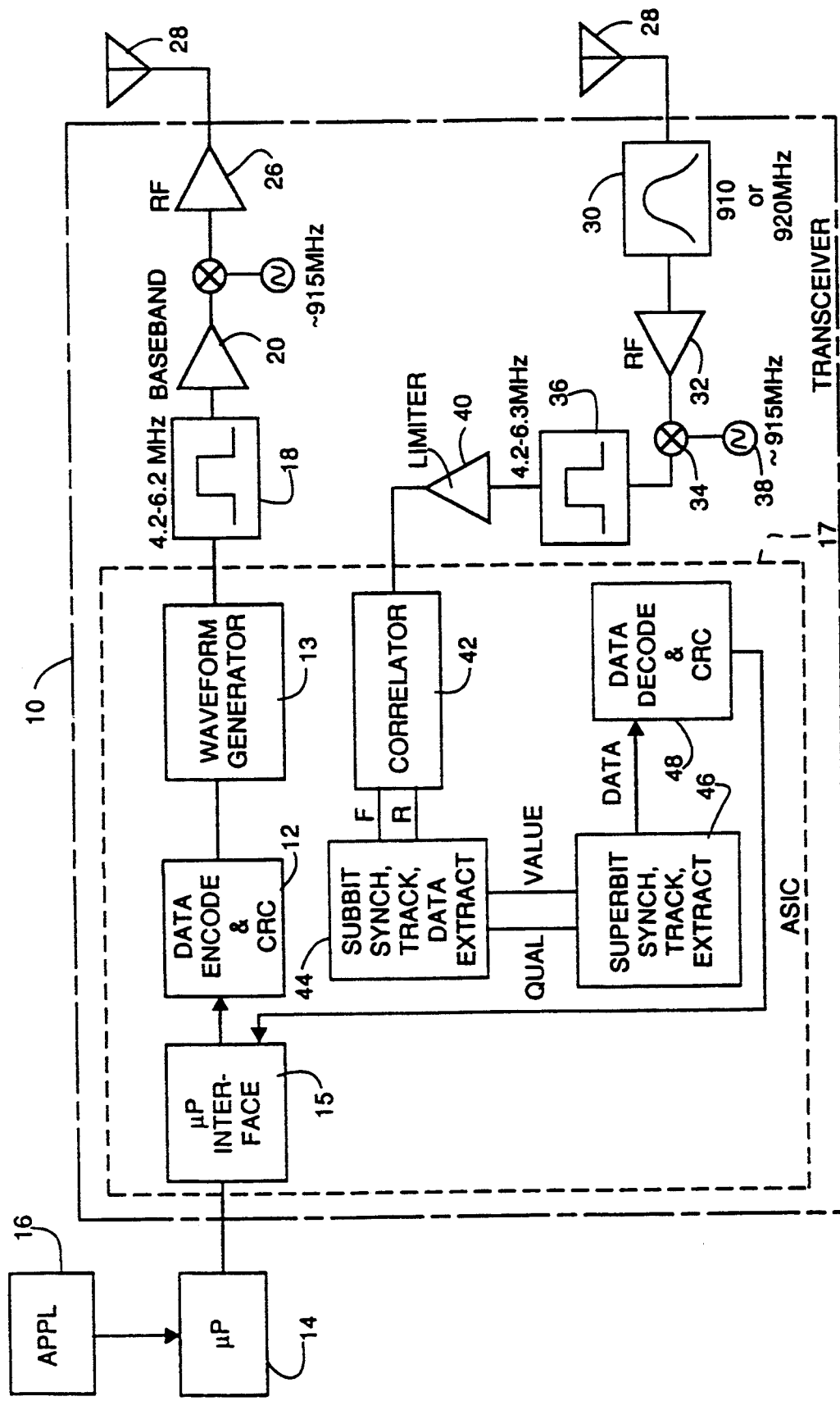
FIG. 1 is a block diagram of an RF transceiver of the invention.

An RF transceiver 10 is shown in FIG. 1. The transmitter portion is shown at the top of the figure. Data to be transmitted across the RF channel are forwarded to the transmitter via a microprocessor 14 under control of application software 16. The data (which are grouped in packets) are received by microprocessor interface 15, and then encoded (with a CRC) at block 12. The data are transformed into chip sequences, with a 25.2 Mhz pulse frequency, by waveform generator block 13. Blocks 12 and 13 are implemented, along with other logic associated with the receiver, as an ASIC. The chip sequence is passed through a 4.2–6.3 Mhz bandpass filter 18 to remove out of band energy, and amplified by baseband amplifier 20. The output of the amplifier is supplied to mixer 22, where the chip sequence biphase modulates a 915 Mhz carrier generated by local oscillator 24. The modulated carrier is then supplied to RF amplifier 26 and antenna 28. The transmitted signal consists of two 2.1 Mhz-wide bands centered at approximately 910 Mhz and 920 MHz.

The receiver portion of the RF transceiver is shown at the bottom of FIG. 1. The signal received from RF antenna 28 is passed through RF bandpass filter 30, which can pass either of the two transmitted bands. The bandpass filtered signal is amplified at RF amplifier 32, and demodulated by mixer 34 (supplied with the output of a 915 MHz local oscillator 38) and bandpass filter 36 (approximately the same as 4.2–6.3 MHz filter 18 in the transmitter). The demodulated signal is passed through a limiting amplifier 40 to transform it into a two-level signal, which is sampled and clocked at 4.2 MHz into correlator 42. The correlator has forward direction sequence and reverse direction sequence outputs F and R. These are supplied to subbit synchronizing, tracking and data extraction logic 44, which outputs a quality and a value bit for each decoded subbit. The quality and value bits are supplied to superbit synchronizing, tracking and data extraction logic 46, the outputs of which are the superbits and a threshold-crossing indicator bit. Data decoder 48 decodes the sequence of superbits, checks the CRC for validity, and supplies decoded data packets to the microprocessor 14 via interface 15.

The transceiver uses direct sequence spread spectrum modulation, in which a code sequence of 1's and 0's specifies biphase modulation of a carrier. The sequences are not, however, conventional pseudorandom direct sequences, or maximal linear sequences. Instead, they approximate a swept frequency chirp, as shown in FIGS. 4A and 4B. Each sequence contains 360 chips occurring at a frequency of 25.2 MHz. A single code sequence is used, and transmitted in either the forward or reverse direction. In a forward direction sequence, the frequency of the square waves begins at 4.2 MHz (six chips per wave) and ends at 6.3 MHz (four chips per wave). A reverse direction sequence is exactly the same pattern transmitted in reverse order. The sequence is a dither pattern as shown in the table in FIG. 5 is used to slowly vary the frequency from 4.2 to 6.3 MHz. The frequency spectrums of the forward and reverse direction sequences are identical and cover a band extending from approximately 4.2 to 6.3 MHz.

Figure 6A:
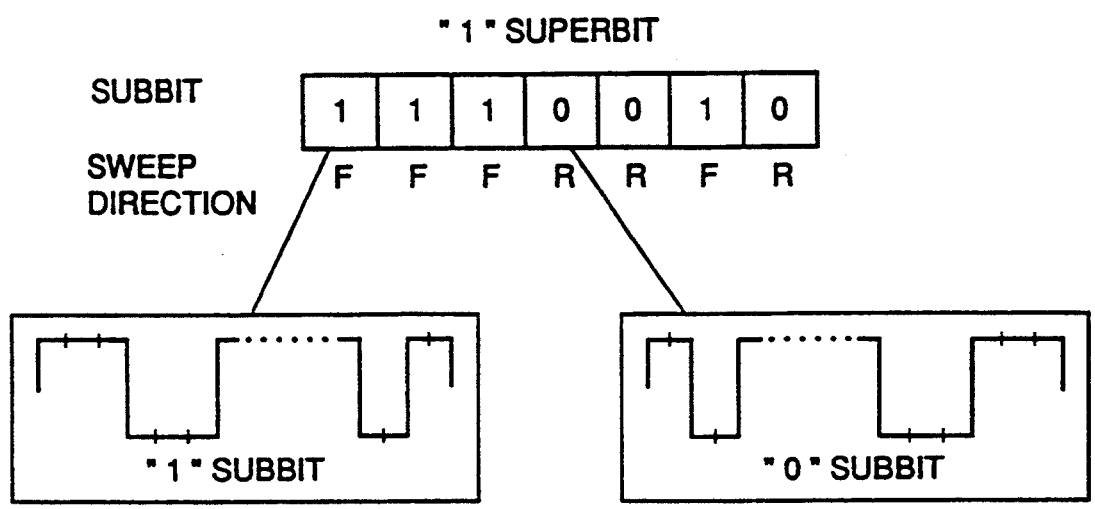
FIGS. 6A and 6B are plots of the forward and reverse subbit sequences used by the transceiver.
Figure 6B:
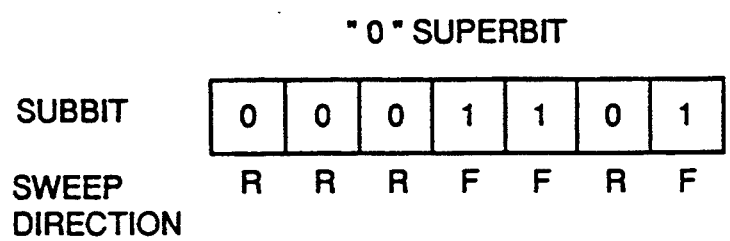

In the receiver, two correlators, one for the forward direction sequence, and one for the reverse direction, are designed to correlate with these approximate swept frequency sequences. Digital subbits are thereby transmitted across the channel, with a "1" being represented by a sequence in one direction, and a "0" by the reverse direction sequence. In some implementations data can be transmitted using just these subbits, with each bit in the data packet corresponded to a subbit, but a further enhancement in processing gain is achieved by grouping the subbits into maximal linear sequence patterns, each seven (7) subbits in length. The patterns are the exact inverse of one another, beginning with three subbits of one state (111), followed by two subbits of the other state (00), and then one subbit of each state (10). The 1110010 pattern of subbits, shown in FIG. 6A, corresponds to what is termed a 1 "superbit," and the inverse pattern 0001101 shown in FIG. 6B what is termed a 0 superbit. The 1110010 pattern is, of course, a sequence of forward and reverse subbit sequences, FFFRRFR, where F is a forward direction 360-chip sequence, and R is a reverse direction 360-chip sequence. Similarly, the 0001101 pattern corresponds to RRRFFRF. But the particular starting point of the pattern is picked arbitrarily.

The superbits correspond to the actual bits making up the data packet and the preamble and packet framing sequences. In some embodiments, e.g., the EIA CEBus protocol, information is transmitted using pulse-width modulation (using what are known as USTs, Unit Symbol Times). Two superbits of the same state, preceded and followed by a superbit of the opposite state, represent one logical state (e.g., a "0" UST), whereas a single superbit of the same state, preceded and followed by a superbit of the opposite state, represents the other logical state (e.g., a "1" UST).

To more evenly spread the energy of the transmitted sequences across the 2.1 MHz-wide band, a pseudorandom modulation of phase with a maximal length 15 code sequence is applied to the final subbit sequences. This is done by exclusive-OR combining the subbit sequence with the repeating 15-bit sequence. The phase modulation operates on the subbit level, either reversing or leaving unchanged the phase of each of the 360 chips in the chip sequence for the particular subbit. The relative primeness of the 15 bit sequence with the seven subbit long sequences (1110010 and 01101) further enhances the randomness of the modulation of phase.

Using phase modulation in this manner is effective in reducing continuous wave interference, by continually changing the phase of the transmitted signal, and improving the power spreading in band. Phase modulation of the chip sequences does not impact the ability of the matched filters to detect them, as the matched filters are able to detect a forward or a reverse sequence independently of the overall, absolute phase of the sequence.

The combined effect of the forward/reverse chip sequences, subbit groupings, and pseudorandom phase modulation is a more uniform spreading of energy across the 2.1 MHz band. All three components of the modulation have an effect on the spectrum. Before modulation, all of the energy is, of course, concentrated in a single spectral line at the carrier frequency, 915 MHz. The subbits, which occur at 70 KHz, divide the energy across the 2.1 MHz-wide band into approximately 30 spectral lines. The forward/reverse pattern of the superbits, which has the effect of impressing a 10 KHz pattern on the subbit-modulated signal, divides the energy in the band into approximately 210 spectral lines. But the energy level of the various lines is uneven due to the approximation dithering of a swept frequency signal in the basic 360 chip sequences and the combination of forward and reverse direction sequences in the superbits. The phase modulation, which impresses a 15-subbit phase pattern that repeats at 4.7 KHz, increases the number of effective lines to greater than 400, thereby further spreading out the power levels of the components, so that the peak power density across the 2.1 MHz band is reduced.

Figure 2:
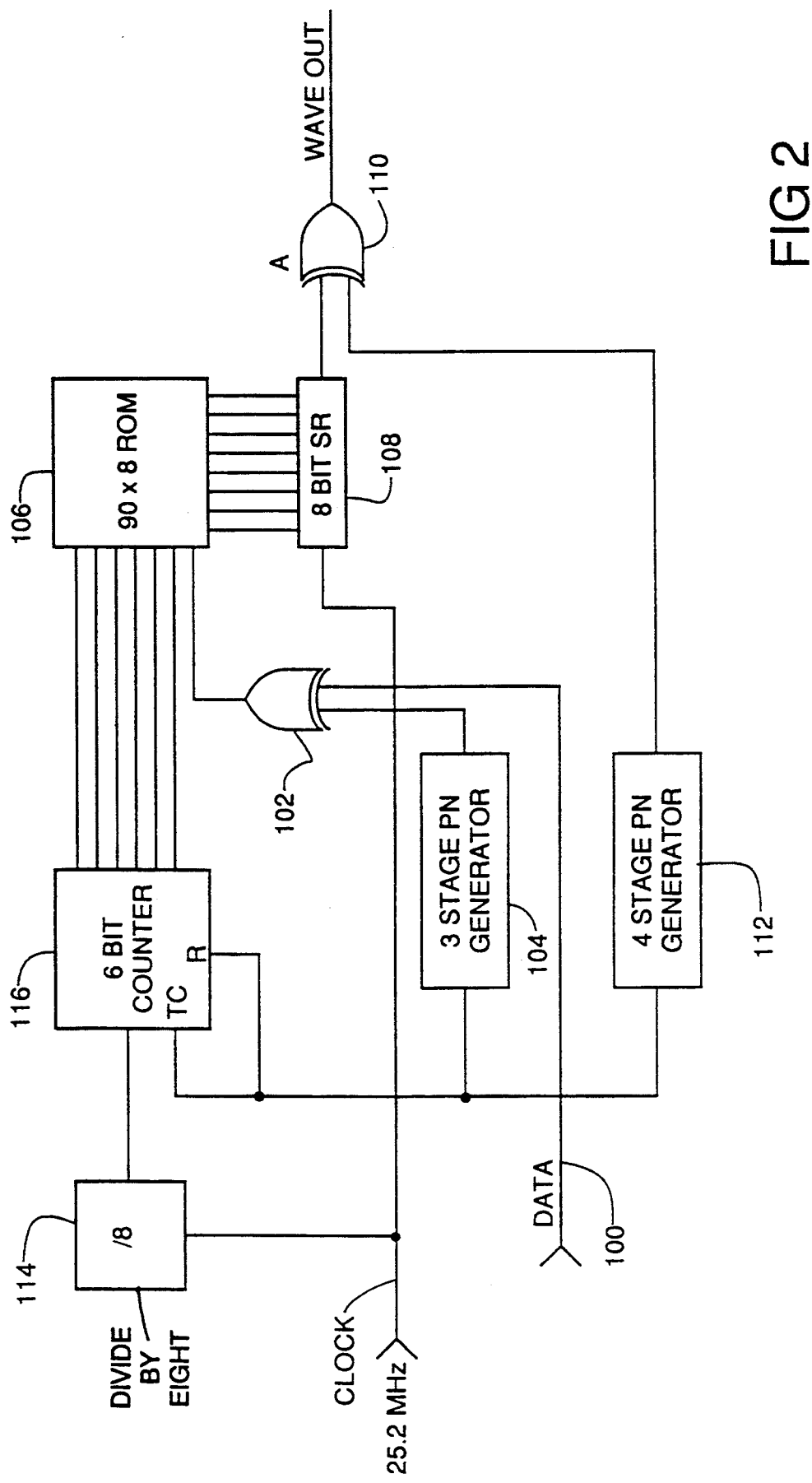
FIG. 2 is a block diagram of the waveform generator logic of the transceiver.

The circuitry for generating the waveform is shown in FIG. 2. Superbits enter the generator logic at 100, and are exclusive-OR combined at gate 102 with the seven-bit subbit sequence generated by polynomial generator 104. The output of gate 102 is supplied to 720 bit ROM 106, in which is stored for implementation convenience separate copies of the chip sequence in forward and reverse order (each requiring 360 bits). Eight bits of the sequences are read out of the ROM at one time into shift register 108. The chip sequences are exclusive-OR combined at gate 110 with the fifteen-bit pseudorandom phase modulation sequence generated by polynomial generator 112. A 25.2 MHz clock and associated divide-by-eight circuit 114 and counter 116 control readout of the chip sequence from the ROM 106.

Figure 10:
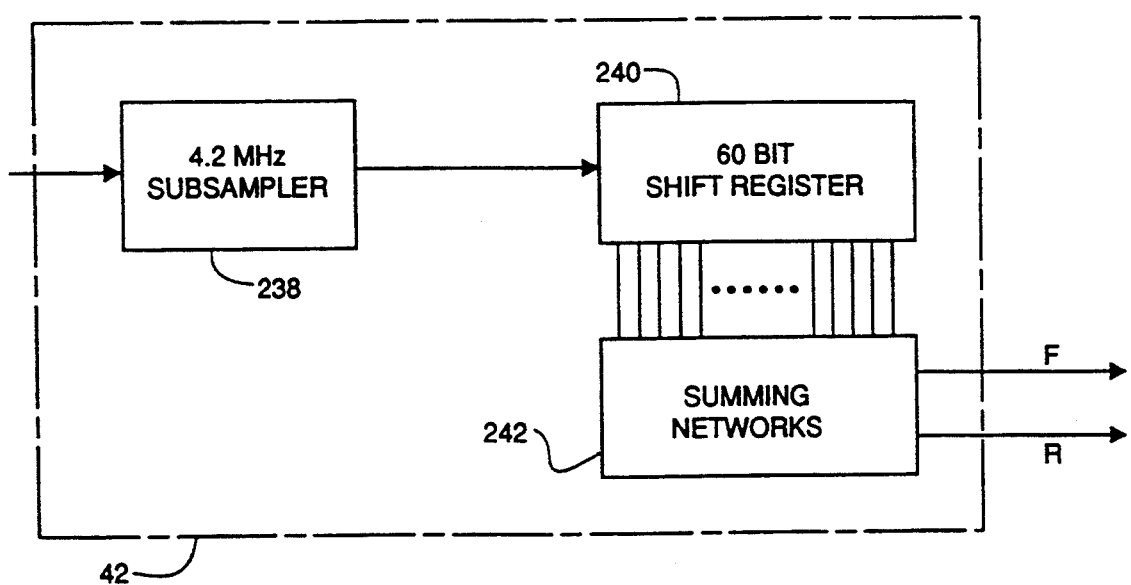
FIG. 10 is a block diagram of the correlator of FIG. 1.

FIG. 10 shows the organization of correlator 42. The correlator functions as two matched filters, one for detecting the forward direction sequence, and one for the reverse direction sequence. The two matched filters could be constructed independently, each with its own shift registers and summing networks, but lower manufacturing costs can be achieved by sharing the shift register and portions of the summing networks between the two matched filters.

Because absolute phase is not preserved in demodulation (as the local oscillator in the receiver is not synchronized with the oscillator in the transmitter), it is actually necessary to have two matched filters, a 0° and 90° filter, for each of the forward and reverse sequences. If only one filter were provided for each sequence, the filter would have no sensitivity to a sequence received with precisely 90° phase shift. By having both 0° and 90° filters, and using the largest of the outputs of the two filters, the correlator can be made less sensitive to phase shift.

As each sequence is 360 bits long, and received at a rate of 25.2 MHz, each of the four matched filters (forward 0° and 90°, reverse 0° and 90°), if constructed in a conventional manner, would need to be 360 bits long and be capable of sampling the received signal at 25.2 MHz. To reduce the size of the matching filters, the received waveform is undersampled at 4.2 MHz (at 238 in FIG. 10A). This produces an aliasing equivalent to mixing the 4.2-6.3 MHz signal with a 4.2 MHz waveform and thereby transformed to a 0-2.1 MHz spectrum. To achieve the necessary sampling accuracy for the 0-2.1 MHz signal, the size requirement of the matching filters is reduced to 60 bits, a 6:1 reduction. Just as importantly, the ASIC can function at an overall lower frequency of 4.2 MHz, except for the waveform generator, where the 25.2 MHz signal is assembled.

To further reduce the complexity of the correlator, the four matched filters are implemented with a single 60 bit shift register 240, and with substantial sharing of resources in the summing networks 242. The symmetry between the forward direction and reverse direction sequences makes much of the sharing possible. The summing network is divided into four subnetworks, each handling approximately $\frac{1}{4}$th of the 60 bits in the shift register, and the outputs of the subnetworks are summed in different ways to produce the desired four matching filter outputs. The shared filter is created in the following way. Two forward direction sequences are generated representing frequency swept waveforms that are shifted 90 degrees from each other. The two waveforms are then used to create two separate matched filters of 60 points each. A combined correlator filter is then constructed by assigning to the 90 degree filter those points where its values are larger than the 0 degree filter, and vice versa. Since the waveforms are 90 degrees offset from each other, the minimum and maximum value points for the correlator filter of the 90 and 0 degree waveforms are also offset. Therefore, the more significant points of each filter are saved. Those points are represented by only one bit in this implementation, representing a positive or negative waveform value. The result is a correlation filter that holds both the forward direction 0 and 90 degree points and which can be used in two approximately equal correlation summing networks.

Since the reverse sequence correlator filter will be the mirror image of the forward sequence, the reverse filter is created by inverting in sequence the bits of the respective 0 and 90 degree points. It will be discovered that the mirror image reverse and the forward filter points will have approximately half of their points in common (the same value) and half different (the opposite value). Thus, to represent the two directional filters, one can divide the existing filter into two parts—a common sub part and a difference subpart. To now create a summing network for the forward correlator filter, the common subpart and the difference subpart are added. To create a summing network for the reverse filter, the difference subpart is subtracted from the common subpart. The above procedure is used for both the 0 and 90 degree portions of the correlator filter.

The result is 4 subnetworks, Com0, Com90, Dif0, and Dif90, that appropriately summed give the 0 and 90 degree correlator values for both the forward and reverse sequences.

$$For0 = Com0 + Dif0$$

$$Rev0 = Com0 - Dif0$$

$$For90 = Com90 + Dif90$$

$$Rev90 = Com90 - Dif90$$

The subnetworks, which are implemented using 59 taps of the shift register, are described in FIGS. 12A-12D. Each of the 59 taps (from 0 to 58) are shown along the horizontal axis of each figure. Each tap has either a +1, 0 or −1 value, wherein each +1 and −1 represents a valid filter tap and each 0 the absence of that tap, for that subnetwork. Each subnetwork uses approximately one-fourth of the taps.

Figure 3:
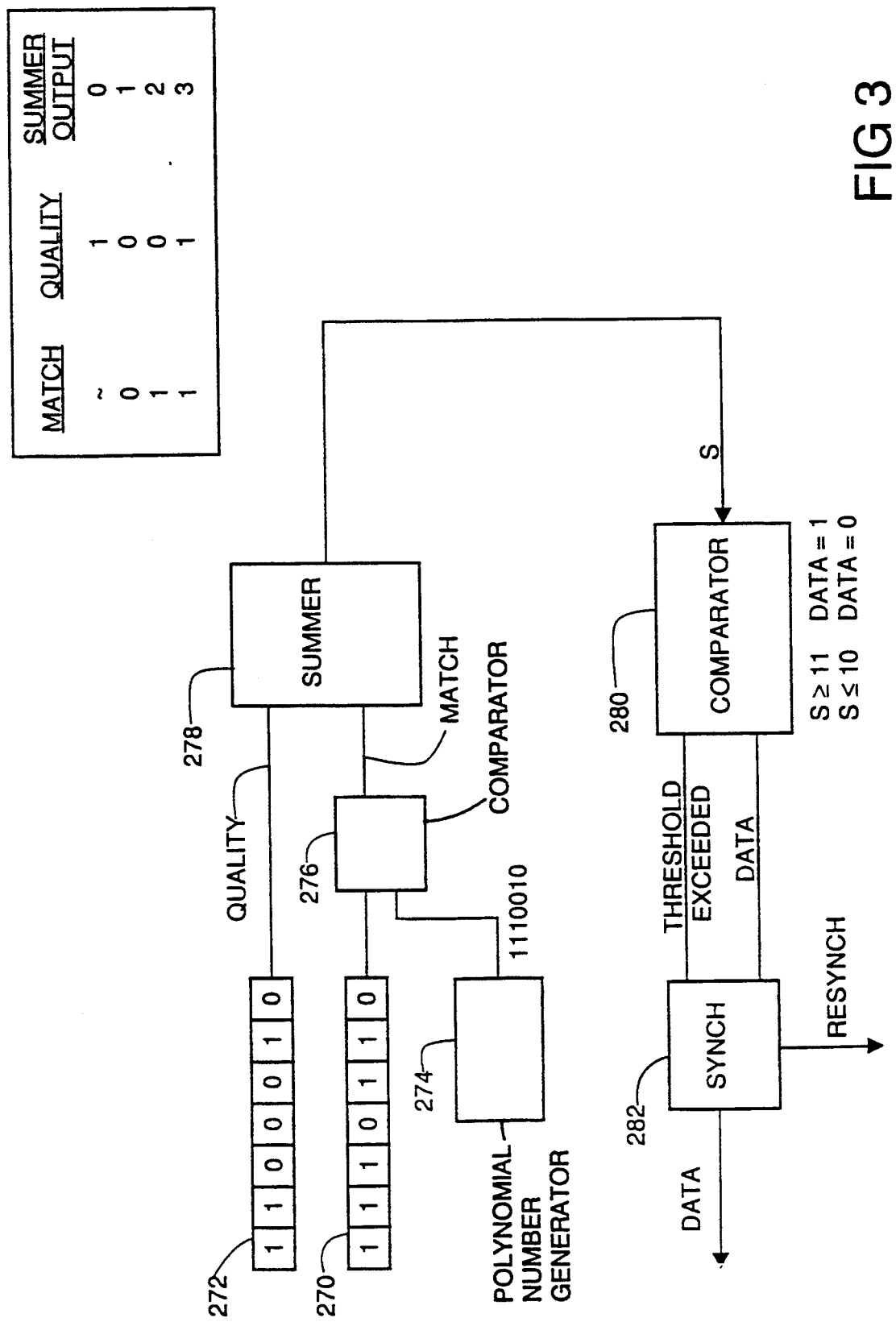
FIG. 3 is a block diagram of the superbit synchronizing, tracking, and data extraction logic for the transceiver.

The resulting matched filters, formed by the addition or subtraction of the subnetworks, according to the expressions given above, are shown in FIGS. 13A-13D. The forward and reverse filters for the same phase are exactly alike except inversely ordered, and the 0 and 90 degree filters for the same direction sequence use different ones of the 59 taps Organization of the subbit synchronizing, tracking, and data extraction logic is shown in FIG. 3. Separate forward and reverse sequence tracking logic is necessary to accommodate differences in the times at which the matched filters will detect forward and reverse sequences. Before describing that tracking logic, it is worthwhile going over briefly the reasons why it is needed. Small variations in the frequency of the local oscillators in the transmitters and receivers have the effect of shifting the frequency content of the received chip sequences to a slightly higher or slightly lower frequency band. And these shifts result in shifts in the time at which the matched filters detect the forward and reverse sequences. These time shifts would not be a problem, but for the fact that the direction of the time shift for forward and reverse sequences is different.

Figure 9A:
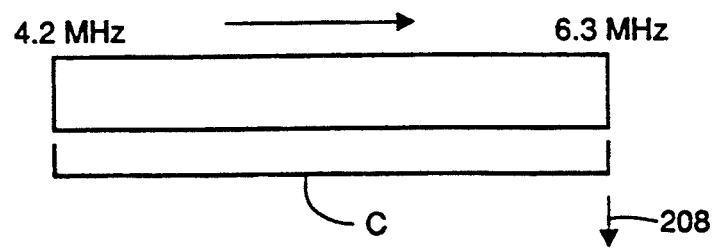
FIGS. 9A-9D are diagrammatic illustrations of the effect of frequency shift on timing in the receiver.

FIGS. 9A-9D illustrate the effect of oscillator frequency shift on a received sequence. The chip sequence in FIG. 9A is the original, forward swept sequence, in which the chips approximate a sweep from 4.2 MHz to 6.3 MHz. The alignment of the correlator at which a peak correlator output occurs is shown diagrammatically at C in the figure.

Figure 9B:
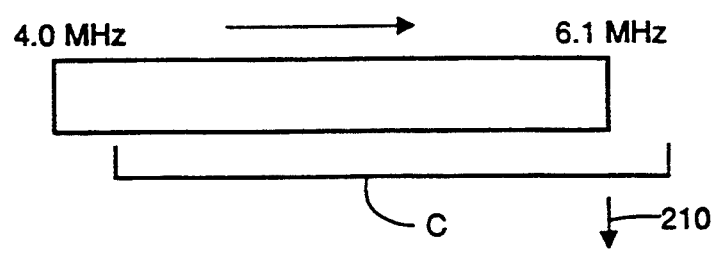

The chip sequence in FIG. 9B has been frequency shifted by 200 KHz so that it begins at 4.0 MHz and ends at 6.1 MHz. The effect of the frequency shift is to change slightly the alignment of the correlator C that produces a maximum output. Maximum correlator output occurs when the left edge of the correlator C is aligned with that portion of the sequence having a frequency content of about 4.2 MHz. In the original, unshifted sequence (FIG. 9A), that occurs when the correlator is aligned exactly with the leading edge of the sequence. But in the frequency-shifted sequence, it occurs slightly into the swept pattern. This shift in alignment means that the time at which the correlator output reaches a maximum is shifted slightly to an earlier time. The difference in time is suggested by arrows 208 and 210. In the case of the frequency-shifted sequence, the time at which the correlator output reaches a maximum (suggested by arrow 210) is slightly earlier than the corresponding time for the unshifted sequence (arrow 208).

Figure 9C:
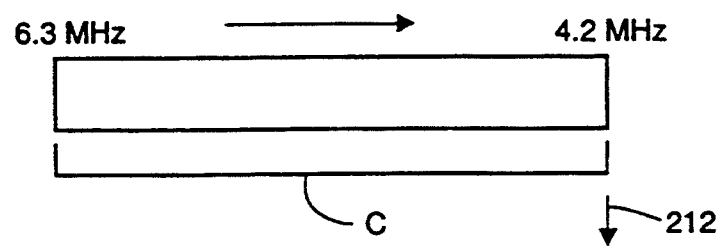
Figure 9D:
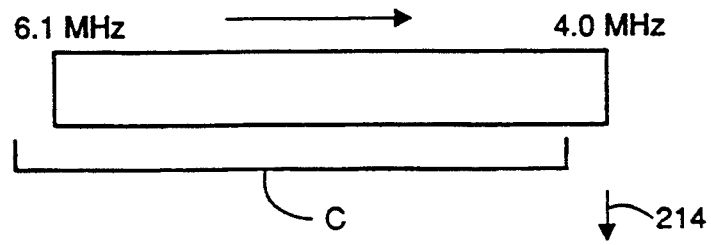

FIGS. 9C and 9D show the same comparison between an unshifted reverse sequence and a frequency-shifted reverse sequence. The same phenomenon occurs, except that the time at which the maximum correlator output occurs is shifted later (instead of earlier) in time (as suggested by arrows 212 and 214).

If the direct sequences used were not frequency swept, but were instead conventional pseudorandom sequences (maximal linear sequences), the effect of frequency shift would not be a simple time shift in correlator output, but a severe (or fatal) degradation in correlation. The reason for this is that conventional pseudorandom sequences have frequency components distributed widely throughout the duration of the sequence, which means that a frequency shift will not simply shift the alignment between the correlator and the received sequence, but so corrupt the received signal as to largely destroy all correlation.

The subbit synchronizing, tracking, and data extraction logic 44 functions as follows. Each correlator output F, R is fed to threshold detection logic. The correlator outputs range in value from 0 to 15. A threshold, e.g., 10 is used for making an initial detection of "carrier", i.e., initial detection of a forward or reverse sequence. If the threshold is met or exceeded, the threshold logic goes through a procedure to assure that it has located the local peak in the correlator output. It looks ahead by one 4.2 MHz clock interval, and if the correlator value one clock ahead is larger, it adjusts the clock accordingly, and looks ahead again. The procedure is followed until the correlator value ahead is smaller. At that point, both a forward and a reverse tracker are initiated by tracking and timing logic.

Figure 11:
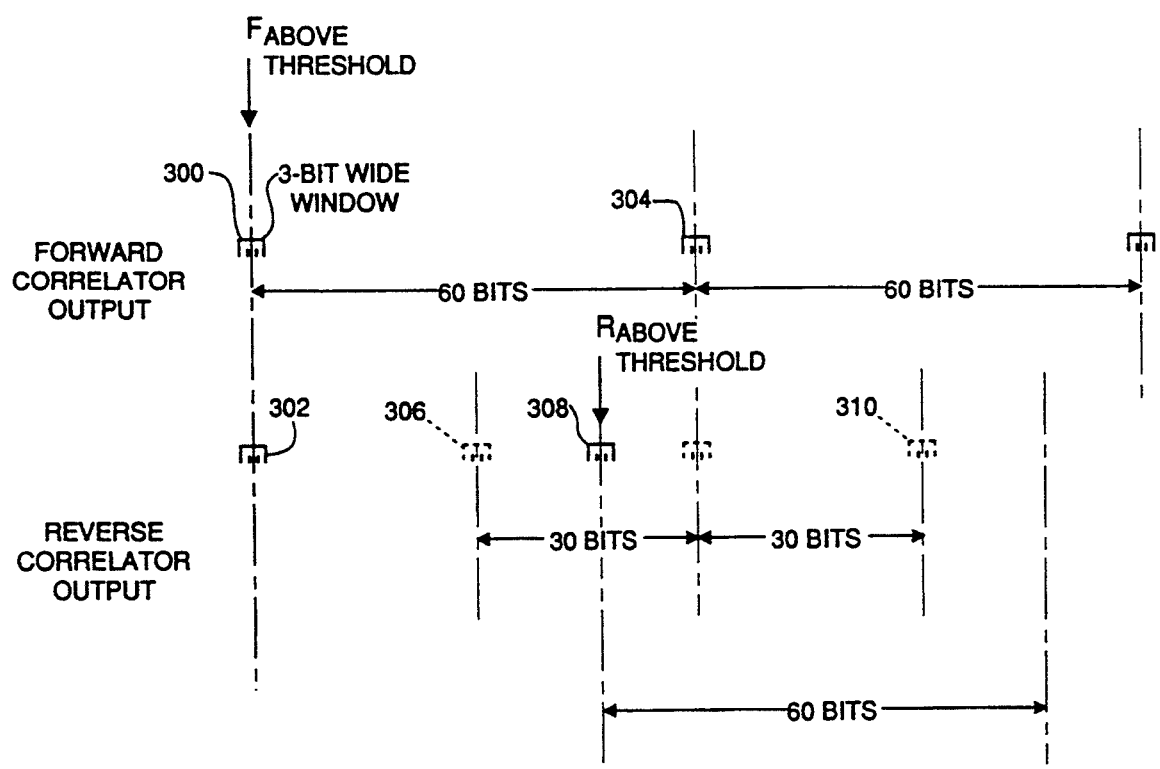
FIG. 11 is an illustration showing operation of the subbit tracking logic.
Figure 12A:
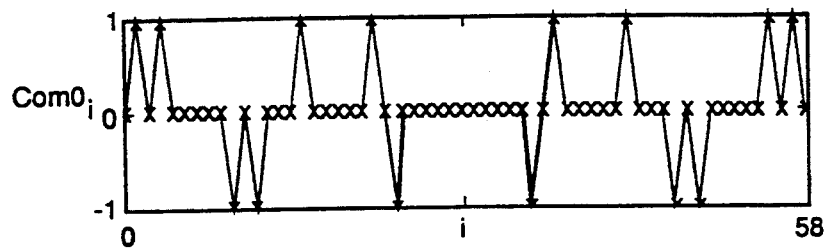
FIGS. 12A-12D are graphs showing four subnetworks used to construct the matched filters of the correlator.
Figure 12B:
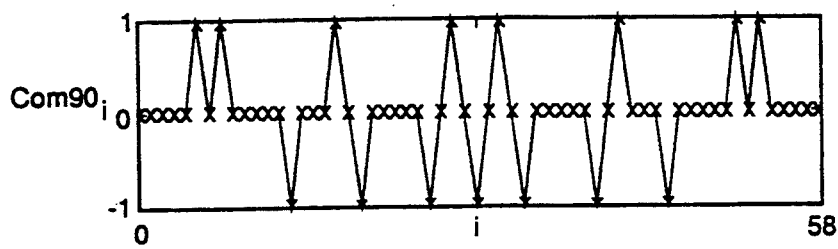
Figure 12C:
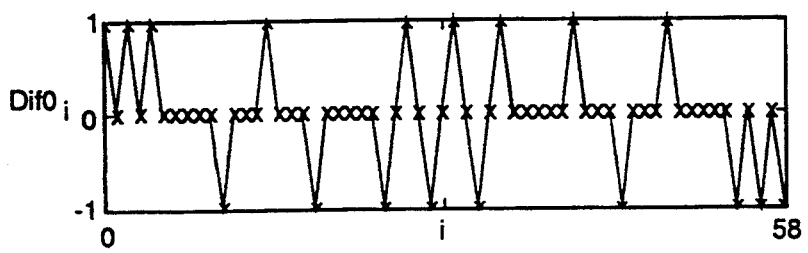
Figure 12D:
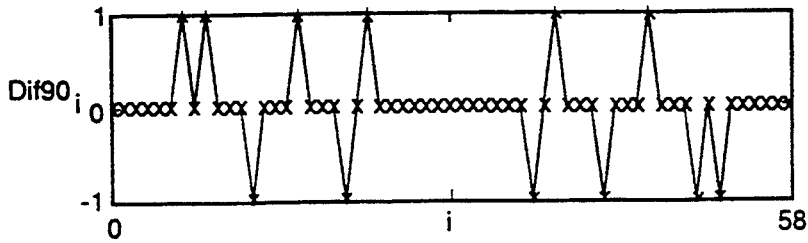
Figure 13A:
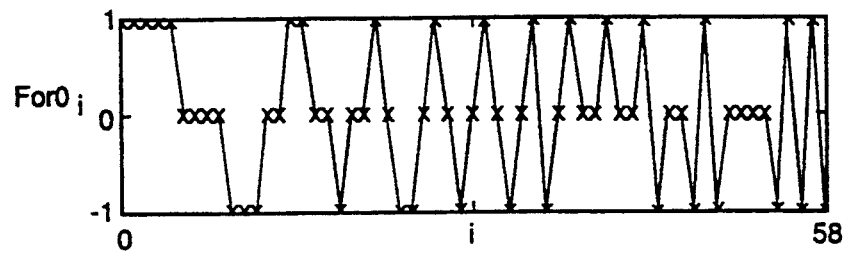
FIGS. 13A-13D are graphs showing the four matched filters constructed from the subnetworks.
Figure 13B:
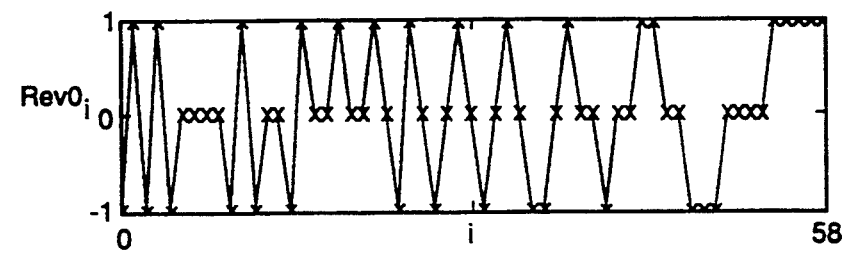
Figure 13C:
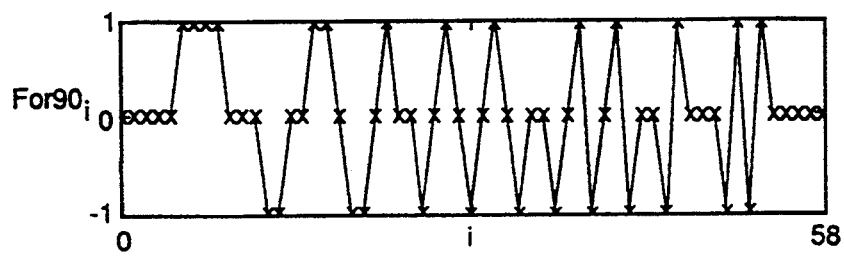
Figure 13D:
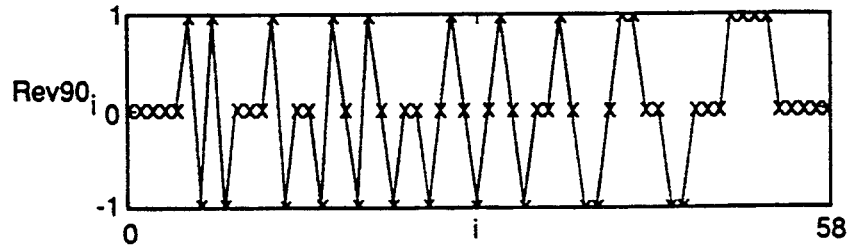

FIG. 11 illustrates operation of the tracking logic following the initial detection of an above threshold output in the forward correlator output. Both the F and R trackers are started at that location (more precisely at the location of the peak above-threshold output), as suggested by window brackets 300, 302. At this point, the forward tracker is properly synchronized, and waits to examine the contents of a 3-bit wide window 304 centered 60 4.2 MHz clock times (60 bits of the correlator, approximately 14 μsec) from the peak that initiated the tracker. The reverse tracker has not, however, synchronized itself with the reverse correlator outputs, which are generally skewed relative to the forward correlator outputs because of the effect of frequency shifts introduced by demodulation. Therefore, beginning 30 clock times after the trackers are initiated (as suggested at location 306) the reverse tracker looks for an above threshold reverse correlator output. If one is found prior to 60 clock times, as suggested at window bracket 308, then the same rules for selecting the largest correlator output (as given above for the forward correlator) are used, and the reverse tracker is reset to start its 60 clock counter at the location of that largest correlator output. If an above threshold reverse correlator output is not found by expiration of the 60 clock period, then the forward correlator output is sampled (largest value within 3-clock interval window centered at 60 clock intervals), and the reverse tracker continues to look for an above threshold output over the next 30 clock times, until location 310. If one is found, then the reverse tracker is reset to start at that location. From this point on, the two trackers function independently, each looking in a 3-clock wide window at 60 clock intervals and choosing the largest value in the window. The inverse of this procedure occurs if it is an above threshold reverse correlator output that starts both trackers.

Each tracker selects the largest output within the 3-clock wide window centered at 60 clocks from the last sample, and provides the output to data extraction logic. The data extraction logic compares the forward and reverse outputs, and decides whether a subbit is a forward or reverse sequence on the basis of which output is larger (ties are decided using an arbitrary but consistent rule, e.g., by choosing forward). The data extraction logic then outputs a 1 or a 0 for the "value" bit (with a 1 designating a forward sequence, and a 0 a reverse sequence).

The trackers also adjust their tracking at each 60 clock interval. Each tracker determines, within the 3-clock wide window, whether it is the lefthand, center, or righthand correlator value that is the largest. That determination is used to nudge the clock timing of the winning tracker (i.e., the one corresponding to the decision made by the data extraction logic) by $+1$, 0, or $-1$ clock time. E.g., if the data extraction logic has decided the subbit is a forward sequence, an adjustment is made to the timing of the forward tracker but not the reverse tracker. These small clock timing adjustments take care of the timing differences that occur because of variations between transmitter and receiver clocking circuitry.

The data extraction circuit also outputs a "quality" value, which is simply a 1 if the decision was made on the basis of an above threshold output, and a 0 if the decision was made on a below-threshold basis. Thus, for each decoded subbit there is a value bit (indicating whether the subbit is decoded as a forward or reverse sequence) and a quality bit (indicating whether or not the decision was made on the basis of an above threshold correlator output).

FIG. 3 shows the organization of the superbit synchronizing, tracking, and data extraction logic 46. Two seven-bit shift registers 270, 272 hold the value and quality bits, respectively, for the most recent seven subbits. At each subbit interval, each subbit in the value shift register 270 is compared (at logic element 276) to the corresponding bit of the correct subbit pattern for a 1 superbit (i.e., 1110010), generated by polynomial number generator 274, to generate a "match" bit. If the value matches the correct pattern, the match bit is set to 1, if not it is set to 0. A string of match bits all equal to 1 (i.e., 1111111) would mean every subbit corresponded to the pattern for a 1 superbit, whereas a string of match bits all equal to 0 (i.e., 0000000) would mean every subbit corresponded to the pattern for a 0 superbit. Summer 278 adds each match bit to each quality bit, according to the rules set forth in the table in the figure. If the match bit is 0, and the quality is 1 (indicating an above threshold based subbit decision), the summer uses a 0, indicating a high likelihood that the subbit in question was properly decoded as part of a 0 superbit. However, if the match bit is 0, but the quality bit is 0 (indicating no threshold crossing in the subbit decoding), the summer adds a 1, indicating a lower likelihood that the subbit was properly decoded as a part of a 0 superbit. Similarly, the summer produces an output of 3 for a 1 match bit and a 1 quality bit, and an output of 2 for a 1 match bit and a 0 quality bit. All seven summer outputs, for each subbit in the shift register, are accumulated, resulting in an output from the summer that amounts to a superbit correlator, and that varies across the range from 0 to 21. This number is supplied to comparator 280, which decides whether the superbit is a 1 or a 0 according to the rule given in the figure. Quite simply, if the summer output S is 11 or greater the superbit is set to 1, and if it is 10 or less the superbit is set to 0.

The comparator also decides whether the superbit is above or below a superbit threshold, using thresholds of 5 and 16. A superbit of 1 is above threshold if the output of the summer is 16 or greater; a superbit of 0 is above threshold if the output of the summer is 5 or less. The above-threshold determination is important for synchronizing on superbits, i.e., deciding where the superbit boundaries are in the stream of subbits. If the comparator produces an above threshold output at a particular subbit, the synchronizing logic 282 assumes that the seven subbits stored in registers 270, 272 correspond to a superbit, and starts a 7-subbit clock. From that point forward in a data packet, superbit decoding is done by looking at every seventh output of the comparator, and decoding based on whether the summer output S is above or below nominal, i.e., assigning a superbit to 1 if S is 11 or above, and to 0 is S is 10 or below. During acquisition of the start-of-packet symbol (the initial packet framing sequence), an above threshold superbit output occurring at other than every seventh output will, however, cause an overall resynchronizing at the superbit level (see discussion below).

The organization of the data packets, as shown in FIG. 7, is quite similar to that disclosed in copending application, U.S. Ser. No. 07/863,213, filed Apr. 3, 1992, entitled Timing for Spread-Spectrum Communication Across Noisy Media, hereby incorporated by reference. Each transmitted packet begins with a contention-resolution preamble 120, followed by a start-of-packet symbol 122 (a predetermined initial sequence of superbits, also referred to as an initial EOF), and then by the packet body data 124. Although not shown, each packet terminates with an end-of-packet symbol (EOP), and is followed by an error-detection cyclical redundancy code (CRC).

Any transceiver may initiate a transmission across the RF medium. Resolution of overlapping contentions for the medium are resolved using the contention-resolution preamble 120. Before a transmitter contends for access to the communication channel, it must observe a quiet period of a prescribed length. The length is a function of the priority of the message, with high priority messages requiring shorter quiet periods than low priority messages. The length of the required quiet period is also randomized by having each transmitter add a further time interval of pseudorandom length to the interval prescribed by the priority of the message. For CEBus the quiet periods are measured in integral numbers of 100-$\mu$sec USTs ("Unit Symbol Times"), and range in length from about four to twenty USTs in length. A quiet period is defined as a matched filter in the receiver not recognizing an above-threshold output (either at the superbit or subbit level).

After a transmitter has detected the required quiet period, it begins sending preamble 120, an ASK (amplitude shift keying) sequence of modified superbits 130 having a pitch of 114 $\mu$sec. The modified superbits are shown in FIG. 8. The same seven subbits 132 are present, each approximately 14.3 $\mu$sec in length, but a 2.0 $\mu$sec quiet period 134 is inserted between each subbit. This lengthens the modified superbit to 114 $\mu$sec The preamble consists of from eight to sixteen 114-$\mu$sec periods, in which a modified superbit is either present (superior state) or absent (inferior state). The length of the preamble is variable because it includes eight pulse-width-modulated symbols. A logical one is represented by a single 114-$\mu$sec interval followed by a change of state (e.g., a superior state followed by an inferior state or vice versa). A logical zero is represented by two 114-$\mu$sec intervals in which the state remains the same followed by a change of state (e.g., two superior states followed by an inferior state or vice versa). In the example shown in FIG. 7, the eight symbols are 01110111, and thus the preamble is ten 114-$\mu$sec periods long, with the two zero symbols using up two 114-$\mu$sec periods, and the six one symbols using only a single 114-$\mu$sec period apiece. As there are normally eight symbols in the CEBus preamble, there are 256 different possible preambles. The actual pattern used by any transmitter varies, and is assigned pseudorandomly (either by the transceiver or the host device). During the inferior states, when the transceiver is not sending a chirp, the transceiver listens for activity on the medium (i.e., a an above-threshold subbit correlator output). If there is activity, the transmitter quits immediately, without sending the next modified superbit in the sequence. If there is not activity, the next modified superbit is sent. By the time the preamble sequence has been completed, a transmitter still sending is able to conclude, with some probability of error, that any other contending transmitters have withdrawn from contention.

If the transmitter survives the contention-resolution process, it immediately sends a start-of-packet symbol 122, which consist of a series of superbits of the same phase (e.g., 1) followed by a superbit of the opposite phase (e.g., 0). These are the superbits described earlier. Each has a duration of 100 $\mu$sec, and consists of seven subbits, each of which has a duration of 100/7 $\mu$sec, or about 14.3 $\mu$sec. They are transmitted without any quiet space between them, and thus at a pitch of 100 $\mu$sec. Immediately following the start-of-packet symbol is the data 24 of the packet. Data is transmitted using the same superbits as in the start-of-packet symbol.

As described in more detail in the above referenced copending application, the receiver does not participate in the contention resolution process. It simply looks for the start-of-packet symbol on the communication medium, and resynchs when it detects a chip sequence inconsistent with the start-of-packet symbol. The receiver has no awareness of whether a contention-resolution phase is ongoing or not, and reacts identically to any sequence it detects, whether it be from the preamble or the start-of-packet symbol.

At the subbit level, the receiver expects to receive a new subbit, either a reverse or a forward sequence, inside of a 3-clock window every 14.3 μsec, as described above. Prior to acquisition of the start-of-packet symbol, the synchronizing, tracking, and data extraction logic continuously examines the correlator outputs F, R for an above-threshold output. If such an output is detected outside of a 7-clock wide blackout window centered at the expected correlator peak (i.e., spaced 60 4.2 MHz clock intervals apart), the subbit and superbit tracking are resynchronized. Thus, when a receiver detects modified superbits, which contain subbits at a 16.3 μsec pitch (because of the 2 μsec quiet periods interposed between the subbits) resynchronizing occurs repeatedly. Thus, ordinarily all of the receivers listening to the channel will be constantly resynchronizing during the contention resolution phase, but the resynchronizing will ordinarily stop once the surviving transmitter has switched to the start-of-packet symbol. But the synchronizing logic will call for resynchronizing if, for some reason, prior to acquisition of the start-of-packet symbol, an above threshold correlator output occurs outside of the 7-clock wide blackout window spaced at 14.3 μsec pitch.

Resynchronizing also occurs at the superbit level, prior to acquisition of the start-of-packet symbol, if an above threshold superbit output is detected by comparator 280 at other than the expected every-seven-subbit time interval. This superbit resynchronization occurs at the superbit level only, however, and thus all that happens is that the superbit data is cleared and superbit alignment is moved to the point of the resynch. The value and quality bits generated by the subbit logic 48 are not disturbed.

The rules used for recognition of the start-of-packet symbol are as follows: (1) four successive superbits must have been detected without resynchronization at either the subbit or superbit level; (2) the last four superbits must have the pattern 1110 or 0001; (3) at least one confirming, above-threshold superbit must have been detected at the expected 100-μsec pitch following the correlation that caused the last resynchronization.

Thus, although the start-of-packet symbol is eight 100-μsec superbits in length, the receiver need not detect the entire pattern of superbits to conclude that the symbol has been received. What must happen is that in the period following a resynchronization there be a confirming correlation at the expected 100-μsec spacing as well as a detected pattern matching the end portion of the start-of-packet symbol (i.e., 1110 or 0001, meaning three superbits of one polarity followed by a single superbit of the other polarity). Thus, there must be, altogether, two above threshold correlations, the one that initiated the resynchronization and the confirming correlation. These rules for recognizing a start-of-packet symbol are designed to increase the processing gain of that portion of the transmission so that it roughly matches the processing gain of the body of the packet.

After the start-of-packet symbol has been acquired, the resynchronization functions are shut down, and data is acquired irrespective of whether an above threshold output occurs at the wrong place. Data decisions are made solely on whether the output of the superbit comparator 280 is above or below nominal, i.e., the superbit is assigned to a 1 if the output is 11 or greater, and to a 0 if the output is 10 or less. If errors do occur, they are typically detected by examination of the CRC following acquisition of the data packet, and the application would ordinarily instruct that the packet be resent.

The subbit tracking and data extraction logic 44 does, however, continue to make sure during acquisition of the body of the packet that "carrier" is present, i.e, that subbits are being received. This could be done in a variety of ways, but the preferred embodiment uses the simple rule that an above threshold subbit must be acquired every 32 subbits. Thus, if the logic goes more than 32 subbits without an above threshold output of the correlator, the receiver assumes loss of carrier, so informs the application, and goes back to a mode of looking for a start-of-packet symbol.

Other embodiments are within the scope of the following claims. For example, in some applications, forward and reverse swept chirps (such as disclosed in copending U.S. application Ser. No. 07/863,213, filed Apr. 3, 1992, entitled Timing for Spread-Spectrum Communication Across Noisy Media) could be used instead of the direct sequence technique of the preferred embodiment. The spread spectrum communication techniques are useful over other media than RF channels; e.g., they could be used over power lines, where the direct sequences (which, themselves, have a passband spectrum) could be transmitted directly without modulation of a carrier.

What is claimed is:

1. A method of transmitting data on a communication channel, comprising the steps of:
   receiving a stream of digital signals for transmission on said communication channel, said digital signals having at least two possible values;
   generating at least two different direct sequences each containing a plurality of chips, said chips being selected to approximate a swept frequency waveform in which successive square waves are formed by said chips, in which the durations of the square waves extend over a plurality of said chips, and in which the frequency of said square waves varies across at least a portion of said sequence;
   encoding said digital signals by using different ones of said direct sequences to represent different values of said digital signals;
   using said direct sequences to generate a direct sequence spread spectrum signal; and
   transmitting said spread spectrum signal across said channel.

2. Apparatus for transmitting data on a communication channel, comprising:
   means for receiving a stream of digital signals for transmission on said communication channel, said digital signals having at least two possible values;
   means for generating at least two different direct sequences each containing a plurality of chips, said chips being selected to approximate a swept frequency waveform in which successive square waves are formed by said chips, in which the duration of each square wave extends over a plurality of said chips, and in which the frequency of said square waves varies progressively across at least a portion of said sequence;

means for encoding said digital signals by using different ones of said direct sequences to represent different values of said digital signals;

means for using said direct sequences to generate a direct sequence spread spectrum signal; and means for transmitting said spread spectrum signal across said channel.

3. The subject matter of claim 1 or 2 wherein said direct sequences are used to modulate a carrier signal to generate said direct sequence spread spectrum signal.

4. The subject matter of claim 3 wherein said modulated carrier signal has a spectrum, and wherein the energy in said spectrum is primarily in one or more passbands.

5. The subject matter of claim 4 wherein said modulated carrier signal transmitted on said channel has two passbands approximately equidistant above and below said carrier signal, with either passband containing sufficient information from which to decode said signal.

6. The subject matter of claim 3 wherein the carrier signal is biphase modulated with said direct sequences.

7. The subject matter of claim 3 wherein said modulated carrier signal is in the RF frequency range.

8. The subject matter of claim 1 or 2 wherein said direct sequences are transmitted directly without modulation of a carrier signal.

9. The subject matter of claim 1 or 2 wherein said direct sequences differ in the direction of sweep of said approximate swept waveform.

10. The subject matter of claim 9 wherein said digital signal is a sequence of two-level bits, and wherein there are two different direct sequences, one with a forward sweep and another with a reverse sweep, and wherein said forward sweep represents one said level of said bits, and said reverse sweep represents the other said level.

11. The subject matter of claim 1 or 2 wherein said direct sequence has a spectrum, and wherein the energy in said spectrum is primarily in a passband.

12. A method of transmitting data on a communication channel, comprising the steps of:

receiving a stream of digital signals for transmission on said communication channel, said digital signals having at least two possible values;

generating at least two different direct sequences each containing a plurality of chips;

encoding said digital signals by using different ones of said direct sequences to represent different values of said digital signals;

modulating a carrier signal with said direct sequences thereby generating a direct sequence spread spectrum signal, said signal having a spectrum; and transmitting said spread spectrum signal across said channel, wherein said direct sequences have a nonpseudorandom pattern of chips selected so that the energy in said spectrum is primarily in a passband.

13. Apparatus for transmitting data on a communication channel, comprising:

means for receiving a stream of digital signals for transmission on said communication channel, said digital signals having at least two possible values;

means for generating at least two different direct sequences each containing a plurality of chips;

means for encoding said digital signals by using different ones of said direct sequences to represent different values of said digital signals;

means for modulating a carrier signal with said direct sequences thereby generating a direct sequence spread spectrum signal, said signal having a spectrum; and means for transmitting said spread spectrum signal across said channel, wherein said direct sequences have a nonpseudorandom pattern of chips selected so that the energy in said spectrum is primarily in a passband.

14. The subject matter of claim 12 or 13 wherein the direct sequences each contain a plurality of chips, said chips being selected to approximate a swept frequency waveform in which successive square waves are formed by said chips, in which the duration of each square wave extends over a plurality of said chips, and in which the frequency of said square waves varies progressively across at least a portion of said sequence.

15. A method of transmitting data on a communication channel, comprising the steps of:

receiving a stream of digital signals for transmission on said communication channel, said digital signals having at least two different values;

generating first and second spread spectrum signals, said first spread spectrum signal having the form of a frequency-swept spread spectrum signal in which frequency is swept in a first direction over at least a portion of said signal, and said second spread spectrum signal having the form of a frequency-swept spread spectrum signal in which frequency is swept in a second direction opposite the first direction over at least a portion of said signal;

encoding said digital signals by representing one said value of said digital signal using said first spread spectrum signal, and representing another said value of said digital signal using said second spread spectrum signal; and transmitting said spread spectrum signals across said channel.

16. Apparatus for transmitting data on a communication channel, comprising:

means for receiving a stream of digital signals for transmission on said communication channel, said digital signals having at least two different values;

means for generating first and second spread spectrum signals, said first spread spectrum signal having the form of a frequency-swept spread spectrum signal in which frequency is swept in a first direction over at least a portion of said signal, and said second spread spectrum signal having the form of a frequency-swept spread spectrum signal in which frequency is swept in a second direction opposite the first direction over at least a portion of said signal;

means for encoding said digital signals by representing one said value of said digital signal using said first spread spectrum signal, and representing another said value of said digital signal using said second spread spectrum signal; and means for transmitting said spread spectrum signals across said channel.

17. The subject matter of claim 15 or 16 wherein said first and second spread spectrum signals are used to modulate a carrier signal.

18. The subject matter of claim 17 wherein said first and second spread spectrum signals are generated by generating first and second direct sequences each containing a plurality of chips, said chips being selected to approximate a swept frequency waveform in which successive square waves are formed by said chips, in which the duration of each square wave extends over a plurality of said chips, and in which the frequency of said square waves varies progressively across at least a portion of said sequence;

said digital signals are encoded by using said first and second direct sequences to represent different values of said digital signals; and said carrier signal is modulated with said first and second direct sequences to generate a direct sequence spread spectrum signal in which information is represented by the direction of frequency sweep in the spread spectrum signal.

19. The subject matter of claim 18 wherein modulation of said carrier signal with said direct sequence comprises biphase modulation of said carrier signal.

20. The subject matter of claim 17 wherein the spectral energy of said spread spectrum signals is primarily in a passband.

21. The subject matter of claim 20 wherein said carrier signal is further modulated with a phase reversal sequence selected to increase the spreading of energy across said passband.

22. The subject matter of claim 15 or 16 wherein said first and second spread spectrum signals are transmitted directly without modulating a carrier signal.

23. The subject matter of claim 15 or 16 wherein said frequency swept spread spectrum signals are frequency swept chirps.

24. The subject matter of claim 15 or 16, further comprising a receiver with matched filters for detecting said forward and reverse swept signals, and with independent tracking for accommodating differences in the times at which said matched filters indicate receipt of the signals.

25. The subject matter of claim 15 or 16, further comprising a receiver with matched filters for detecting said forward and reverse swept signals, and with independent tracking for accommodating differences in the times at which said matched filters indicate receipt of the signals.

26. A method of receiving and decoding data that has been encoded and transmitted using forward and reverse swept frequency spread spectrum signals, so that the received signal consists of a succession of spread spectrum signals in which information is encoded as the difference in direction of sweep, so that different digital values are represented by different patterns of forward and reverse swept frequency signals, said method comprising the steps of:

receiving said stream of frequency swept spread spectrum signals;

passing said signals through a correlator having forward and reverse outputs, the forward output representing the correlation of a received signal to the forward swept spread spectrum signal, and the reverse output representing the correlation of a received signal to the reverse swept spread spectrum signal;

tracking the forward correlator output so that the forward correlator output is sampled at times when a received signal would be received if it was a forward swept signal;

tracking the reverse correlator output independently of the tracking of the forward correlator output so that the reverse correlator output is sampled at times when a received signal would be received if it was a reverse swept signal; and making decisions as to whether a received signal is a forward or reverse swept signal based on samples of the forward and reverse correlator outputs that are taken generally at different times.

27. Apparatus for receiving and decoding data that has been encoded and transmitted using forward and reverse swept frequency spread spectrum signals, so that the received signal consists a succession of spread spectrum signals in which information is encoded as the difference in direction of sweep, so that different digital values are represented by different patterns of forward and reverse swept frequency signals, said apparatus comprising:

means for receiving said stream of frequency swept spread spectrum signals;

means for passing said signals through a correlator having forward and reverse outputs, the forward output representing the correlation of a received signal to the forward swept spread spectrum signal, and the reverse output representing the correlation of a received signal to the reverse swept spread spectrum signal;

means for tracking the forward correlator output so that the forward correlator output is sampled at times when a received signal would be received if it was a forward swept signal;

means for tracking the reverse correlator output independently of the tracking of the forward correlator output so that the reverse correlator output is sampled at times when a received signal would be received if it was a reverse swept signal; and means for making decisions as to whether a received signal is a forward or reverse swept signal based on samples of the forward and reverse correlator outputs that are taken generally at different times.

28. The subject matter of claim 26 or 27 wherein the receiver includes a local oscillator for generating a signal that is mixed with the received signal to demodulate the received signal, and wherein said local oscillator is not synchronized to the local oscillator used for modulating the signal at the transmitter, and wherein said local oscillator is therefore generally operating at a different frequency and phase from that of the local oscillator used for modulating.

29. The subject matter of claim 26 or 27 wherein the forward and reverse swept signals are generated using forward and reverse swept direct sequences.

30. A method of transmitting data on a communication channel, comprising the steps of:

receiving a stream of digital signals for transmission on said communication channel, said digital signals having at least two possible values;

generating at least two different direct sequences each containing a plurality of chips, the difference between said direct sequences being recognizable independently of the relative phase between the two sequences;

encoding said digital signals by using different ones of said direct sequences to represent different values of said digital signals;

pseudorandomly varying the overall phase of said direct sequences;

using said direct sequences to generate a direct sequence spread spectrum signal, said signal having a spectrum; and transmitting said spread spectrum signal across said channel.

31. Apparatus for transmitting data on a communication channel, comprising:
   means for receiving a stream of digital signals for transmission on said communication channel, said digital signals having at least two possible values;
   means for generating at least two different direct sequences each containing a plurality of chips, the difference between said direct sequences being recognizable independently of the relative phase between the two sequences;
   means for encoding said digital signals by using different ones of said direct sequences to represent different values of said digital signals;
   means for pseudorandomly varying the overall phase of said direct sequences;
   means for using said direct sequences to generate a direct sequence spread spectrum signal, said signal having a spectrum; and
   means for transmitting said spread spectrum signal across said channel.

32. The subject matter of claim 30 or 31 wherein said direct sequences are used to modulate a carrier to generate said direct sequence spread spectrum signal.

33. The subject matter of claim 31 or 31 wherein said pseudorandom variation of phase is done so that each successive direct sequence has its phase pseudorandomly varied with respect to prior sequences.

34. The subject matter of claim 33 in which the double level coding is used, in which subbits are represented by one or more of said direct sequences, and said subbits are arranged in at least two different subbit patterns, and in which the pseudorandom variation of phase is at the subbit level so that the phase of the direct sequences varies pseudorandomly from subbit to subbit.

35. The subject matter of claim 34 wherein the pseudorandom variation repeats after a time period that is greater than the number of subbits in said subbit patterns, and that is not an integral multiple of the length of said subbit patterns.

36. The subject matter of claim 30 or 31 wherein the pseudorandom variation of phase reduces the peak power in the spectrum of the transmitted signal by comparison to the peak power in the spectrum of the transmitted signal without the pseudorandom variation of phase.

37. A method of receiving and decoding data that has been encoded and transmitted using dual level spread spectrum modulation in which information is conveyed as superbits, and in which superbits are encoded as unique sequences of a plurality of subbits, each represented by a unique spread spectrum signal, said method comprising the steps of:
   receiving a stream of spread spectrum signals;
   passing said signals through a correlator configured to distinguish between said unique spread spectrum signals representing said subbits;
   sampling the output of the correlator, and determining therefrom the values of a succession of subbits;
   determining a quality indicator from the strength of the sampled correlator output used in determining the value of a subbit;
   combining the value and quality indicators for a succession of subbits in decoding the superbits.

38. Apparatus for receiving and decoding data that has been encoded and transmitted using dual level spread spectrum modulation in which information is conveyed as superbits, and in which superbits are encoded as unique sequences of a plurality of subbits, each represented by a unique spread spectrum signal, said apparatus comprising:
   means for receiving a stream of spread spectrum signals;
   means for passing said signals through a correlator configured to distinguish between said unique spread spectrum signals representing said subbits;
   means for sampling the output of the correlator, and determining therefrom the values of a succession of subbits;
   means for determining a quality indicator from the strength of the sampled correlator output used in determining the value of a subbit;
   means for combining the value and quality indicators for a succession of subbits in decoding the superbits.

39. The subject matter of claim 37 or 38 wherein each superbit is represented by a fixed number of subbits, and wherein a superbit correlation output is determined at each subbit from the value and quality indicators for a segment of subbits of the same length as said fixed number of subbits making up a superbit.

40. The subject matter of claim 39 wherein the superbit correlation is determined by accumulating a total of a match indicator and the quality indicator for each subbit in said segment of subbits, wherein the match indicator is determined by comparing said unique sequences of subbits to the actual subbit values in said segment.

41. The subject matter of claim 40 wherein the superbit correlation output has a range of values representative of the likelihood that the received pattern of spread spectrum signals is one of the unique sequences of subbits representing a superbit, wherein superbit decoding is performed by initiating a superbit tracker when the superbit correlation output exceeds a threshold, and by sampling the superbit correlation output at intervals spaced by the length of a superbit following detection of the above-threshold correlation output.

42. The subject matter of claim 12, 13, 15, 16, 26, 27, 30, 31, 37, or 38 wherein said spread-spectrum signals are transmitted at RF frequencies.

43. A method of transmitting data on a communication channel, comprising the steps of:
   receiving a stream of digital signals for transmission on said communication channel, said digital signals having at least two possible values;
   generating a direct sequence containing a plurality of chips;
   encoding said digital signals by using said direct sequence and a reverse ordered sequence, identical to said direct sequence except having the reverse order, to represent different values of said digital signals; and
   transmitting said direct and reverse ordered sequences across said channel.

44. Apparatus for transmitting data on a communication channel, comprising:
   means for receiving a stream of digital signals for transmission on said communication channel, said digital signals having at least two possible values;
   means for generating a direct sequence containing a plurality of chips;
   means for encoding said digital signals by using said direct sequence and a reverse ordered sequence, identical to said direct sequence except having the reverse order, to represent different values of said digital signals; and means for transmitting said direct and reverse ordered sequences across said channel.

45. The subject matter of claim 43 or 44 wherein said direct and reverse ordered sequences are used to modulate a carrier signal, and the modulated carrier signal is transmitted across said channel.

46. The subject matter of claim 45 wherein said modulated carrier signal is in the RF frequency range.

47. The subject matter of claim 43 or 44 wherein said direct and reverse ordered sequences approximate swept frequency waveforms, in which successive square waves are formed by said chips, and in which the durations of the square waves extend over a plurality of said chips, and in which the frequency of the square waves varies approximately progressively across at least a portion of said sequence, from a low to a higher frequency in a forward swept sequence, and from a high to a lower frequency in a reverse swept sequence.

48. The subject matter of claim 43 or 44 wherein said direct sequence and reverse ordered sequence each have a spectrum, and wherein the energy in said spectrum is primarily in a passband.

49. The subject matter of claim 43 or 44 wherein said direct sequence and said reverse-ordered sequence are transmitted directly without modulation of a carrier.

50. The subject matter of claim 49 wherein said direct and said reverse-ordered sequence are transmitted over power lines.

51. A method of receiving and decoding data that has been encoded and transmitted using forward and reverse ordered versions of a direct sequence, so that the transmitted signal comprises a sequence of spread spectrum signals corresponding to one of said forward and reverse ordered versions of said direct sequence, said method comprising the steps of:
   receiving said sequence of spread spectrum signals;
   passing said received signals through a correlator configured to provide forward and reverse correlator outputs, the forward output representing the correlation of a said received signal to the forward directed sequence, and the reverse output representing the correlation of a said received signal to the reverse directed sequence; and
   using said forward and reverse correlator outputs to decode said received signals to reconstruct the digital data encoded in the transmitter.

52. Apparatus for receiving and decoding data that has been encoded and transmitted using forward and reverse ordered versions of a direct sequence, so that the transmitted signal comprises a sequence of spread spectrum signals corresponding to one of said forward and reverse ordered versions of said direct sequence, said apparatus comprising:

means for receiving said sequence of spread spectrum signals;
a correlator for receiving said sequence of signals and configured to provide forward and reverse correlator outputs, the forward output representing the correlation of a said received signal to the forward directed sequence, and the reverse output representing the correlation of a said received signal to the reverse directed sequence; and
a decoder for using said forward and reverse correlator outputs to decode said received signals to reconstruct the digital data encoded in the transmitter.

53. The subject matter of claim 51 or 52 wherein said received signals are demodulated using a locally generated carrier signal prior to being applied to the correlator.

54. The subject matter of claim 51 or 52 wherein
said correlator comprises a forward matched filter configured to recognize said forward ordered direct sequence and a reverse matched filter configured to recognize said reverse ordered direct sequence,
wherein said forward matched filter is the mirror image of said reverse matched filter, and
wherein said forward and reverse matched filters share the same shift register.

55. The subject matter of claim 54 wherein said correlator comprises four matched filter sections, a 0 and 90 degree phase section for each of said forward and reverse ordered sequences.

56. The subject matter of claim 55 wherein approximately half of the taps in said shift register are assigned to 0-degree sections and the remainder of the taps are assigned to 90-degree sections;
   wherein for each of the taps assigned to 0-degree sections and for each of the taps assigned to 90-degree there are formed two additional groups of taps, a common group that have the same value for the forward and reverse ordered sequences and a different group that have opposite values for the forward and reverse ordered sequences;
   wherein each of the four groups of taps is summed to form four sums, a 0-degree common sum, a 0-degree difference sum, a 90-degree common sum, and a 90-degree difference sum; and
   wherein the outputs of each of said four filter sections are formed by combining corresponding common and difference sums.

57. The subject matter of claim 56 wherein said combining of corresponding common and difference sums comprises forming the sum of said common and difference sums for one of said forward and reverse ordered sequences and forming the difference of said common and difference sums for the other of said sequences.

* * * * *

UNITED STATES PATENT AND TRADEMARK OFFICE
CERTIFICATE OF CORRECTION

PATENT NO.   : 5,359,625

DATED        : October 25, 1994

INVENTOR(S)  : James E. Vander Mey and Timothy J. Vander Mey

It is certified that error appears in the above-identified patent and that said Letters Patent is hereby corrected as shown below:

Column 1, line 14, "5.278,862" should be --5,278,862--.

Column 6, line 19, "01101" should be --0001101--.

Column 8, line 49, after "taps" insert --.--.

Column 11, line 45, "0 is S" should be --0 if S--.

Signed and Sealed this

Twenty-fourth Day of January, 1995

Attest:

BRUCE LEHMAN

*Attesting Officer*          Commissioner of Patents and Trademarks